United States Patent [19]

Wimmer et al.

[11] Patent Number: 5,448,671
[45] Date of Patent: Sep. 5, 1995

[54] REPLACEMENT ASSEMBLY FOR AN IMAGE INTENSIFIER DEVICE INCLUDING FIBER OPTIC INVERTER EXPANDER

[75] Inventors: Jack D. Wimmer; Mark S. Robinson, both of Roanoke, Va.

[73] Assignee: ITT Corporation, New York, N.Y.

[21] Appl. No.: 189,187

[22] Filed: Jan. 31, 1994

[51] Int. Cl.⁶ .............................. G02B 6/06
[52] U.S. Cl. .............. 385/116; 250/214 LA; 359/353; 385/120
[58] Field of Search .............. 385/115–121, 385/147; 359/353, 399, 400, 407; 250/214 LA, 214 LS, 214 VT

[56] References Cited

U.S. PATENT DOCUMENTS

| | | | |
|---|---|---|---|
| 3,803,407 | 4/1974 | Anderson | 385/116 X |
| 4,709,985 | 12/1987 | Takeuchi | 385/116 |
| 4,961,278 | 10/1990 | Johnson et al. | 359/400 X |
| 5,029,963 | 7/1991 | Naselli et al. | 385/119 X |
| 5,084,780 | 1/1992 | Phillips | 359/353 X |
| 5,125,064 | 6/1992 | Naselli et al. | 385/116 |
| 5,268,570 | 12/1993 | Kim | 250/214 VT |
| 5,305,142 | 4/1994 | Phillips et al. | 250/214 VT X |

Primary Examiner—John D. Lee
Attorney, Agent, or Firm—Arthur L. Plevy; Patrick M. Hogan

[57] ABSTRACT

The present invention is an image intensifier assembly that includes a Generation III image intensifier tube coupled to a single piece fiber optic inverter expander element. The single optical couple to the fiber optic expander element greatly enhances the overall performance parameters of the Gen III tube, as compared to traditional relay lens assemblies. The present invention image intensifier assembly can be directly substituted for a Generation II image intensifier tube assembly in a given application.

25 Claims, 4 Drawing Sheets

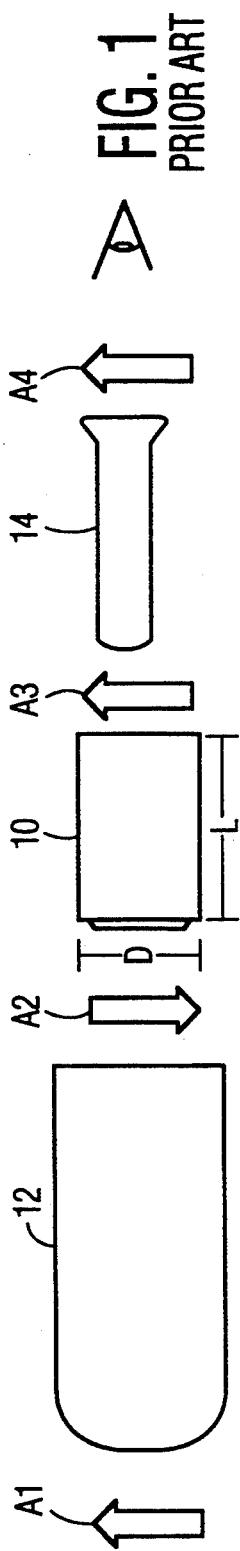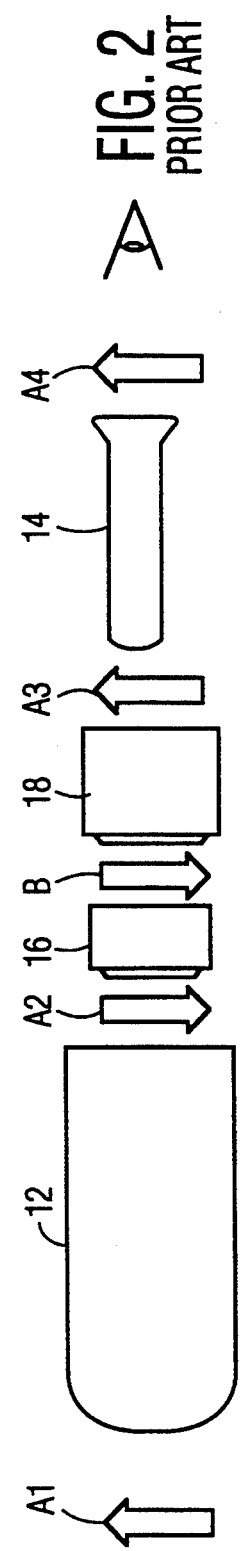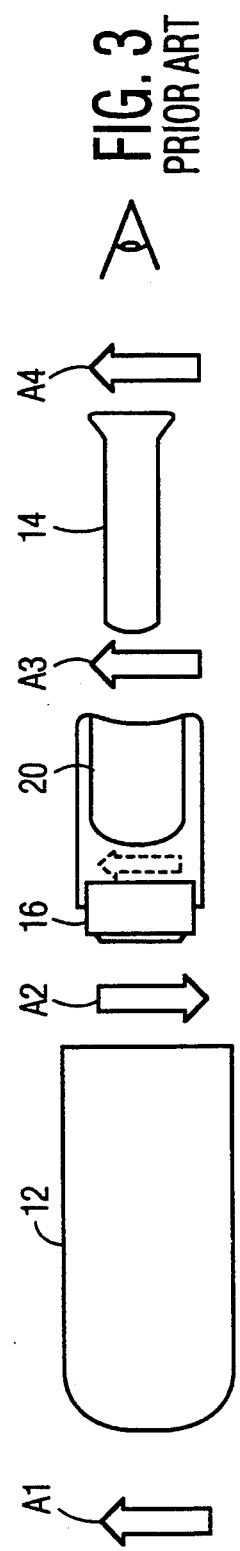

REPLACEMENT ASSEMBLY FOR AN IMAGE INTENSIFIER DEVICE INCLUDING FIBER OPTIC INVERTER EXPANDER

FIELD OF THE INVENTION

The present invention relates to a generation III image intensifier assembly that can be substituted for the previously employed Generation II image intensifier used in a plurality of night vision devices.

BACKGROUND OF THE INVENTION

Image intensifier tubes are well known in the industry by their commonly used names, based on the generic generation from which their design came into being. The tubes have evolved from Generation 0 to the current Generation III. These tubes have typically been produced in both 18 mm and 25 mm diameter formats.

A significant portion of the military and commercial night vision equipment currently in use was designed to physically accommodate a 25 mm format Generation II (Gen II) image intensifier tube. The military equipment that uses the Gen II tube, includes Driver's Night Vision Viewers, Individual Served Weapon Sights, Crew Served Weapon Sights, and other night vision devices that facilitate the operation of motorcraft in low light conditions and for other applications as well.

The Gen II image intensifier tube conforms to very detailed U.S. military specifications and is identified by its U.S. military part number: MX-9644. The performance of the Gen II image intensifier tube is no longer the state of the art. The Gen II image intensifier tube is an inverter tube and exhibits a gain at $2 \times 10^{-6}$ foot candles input of from 20,000 to 70,000 with a typical gain of 50,000. The photocathode of a Gen II tube exhibits a luminous sensitivity of approximately 325 microamps per lumen at 2856° K. The Gen II image intensifier tube exhibits a signal-to-noise ratio of approximately 4:1 and a resolution of twenty eight line pairs per millimeter (lp/mm).

A higher performance image intensifier tube has been developed in the Generation III (Gen III) proximity focussed image intensifier tube. A Gen III image intensifier tube employs a gallium arsenide photocathode that has an improved photosensitivity that operates at starlight levels and below. A Gen III image intensifier device, with a fiber optic output screen, exhibits a luminous gain in the range of 20,000 to 70,000 at $2.0 \times 10^{-6}$ foot candles. The sensitivity of the Gen III photocathode is over 1000 microamps per lumen at 2856° K., which is more than three times that of the Gen II tube. The signal-to-noise ratio has been increased to approximately 16:1. In addition, the resolution has been increased to 36–40 lp/mm.

In view of the above performance statistics it should be obvious that the Gen III image intensifier tube is more desirable than the Gen II image intensifier tube, and the Gen III tube should be substituted for the Gen II tube wherever possible. However, certain problems arise when such a substitution is attempted. As has been previously mentioned, many night vision applications were designed and built around the Gen II image intensifier tube. In such applications the size and shape of the night vision device was formed to enclose the MX-9644 Gen II tube. Additionally, the objective lens optics and the eyepiece optics were designed to complement the input and output of the Gen II tube.

In FIG. 1 there is shown a typical night vision application of the Gen II image intensifier tube 10. Positioned at the pupil of the Gen II image intensifier tube 10 is an objective lens assembly 12. Positioned at the rear of the Gen II image intensifier tube 10 is an eyepiece lens assembly 14. The shown optical assembly can represent any night vision application that utilizes the MX-9644 Gen II image intensifier tube. In operation, the objective lens assembly 12 is directed at a target object A1. The objective lens assembly 12 presents an inverted image A2 to the pupil of the Gen II image intensifier tube 10. In turn, the Gen II image intensifier tube inverts the image A2 to form an upright visible image A3 to the pupil of the eyepiece lens assembly 14. Finally, the eyepiece lens assembly 14 presents an upright image A4 to the eye of the observer.

When retrofitting a Generation III image intensifier tube into a Generation II application, two problems occur. First is the size differential. A Gen II image intensifier tube has a length L of approximately 77 mm and has a nominal diameter D of approximately 62 mm. A Gen III image intensifier tube has a length of 16.4 mm and also embodies a smaller nominal diameter. Such a size differential obviously affects the focal positions of the objective lens assembly 12 and the eyepiece lens assembly 14, since both can no longer be properly focussed in relation to the undersized Gen III tube.

The second problem that occurs when retrofitting a Gen III tube into a Gen II tube application, is that the MX-9644 Gen II image intensifier tube inverts the image, whereas the 25 mm format Gen III image intensifier tubes typically do not. Consequently, if a Gen III tube is directly substituted for a Gen II tube, the image viewed by an observer would be inverted.

To solve the above problems of retrofitting a Gen III image intensifier tube into a Gen II tube application, two approaches have been tried. Referring to FIG. 2 the first approach is illustrated. In this prior art embodiment, a Gen III image intensifier tube 16 and a Generation I (Gen I) image intensifier tube 18 are placed in series. The attachment of the Gen I tube 18 to the Gen III tube 16 gives the combined assembly approximately the same length as the MX-9644 Gen II image intensifier tube. As such, the pupil of the Gen III tube is properly distanced from the objective lens assembly 12 and pupil of the eyepiece lens assembly 14 is properly distanced from the output screen of the Gen I tube 18. The problem of inversion is also solved by the combined Gen III tube and Gen I tube assembly, since the Gen I tube 18 reinverts the inverted image B from the objective lens, which is passed through the Gen III tube 16 without inversion. As such, the Gen III and Gen I tube assembly provides the same upright image as would a lone Gen II image intensifier tube.

The combined Gen III and Gen I tube assembly does have disadvantages. The use of adjacent image intensifier tubes produces significant optical losses in the fiber optic plates added to the interface between the two tubes. Similarly, optical losses occur due to the limited mean time to failure (MTF) of the Gen I electron optics. Since two tubes are used, a more complicated power supply is needed to operate both tubes. Gen I tubes are expensive and becoming increasingly difficult to find because of their obsolescence in favor of the Gen II and Gen III image intensifier tubes. Additionally, by combining a Gen III tube with a Gen I tube, two vacuum envelopes are now included in one application. A consequence of two vacuum envelopes is a shorter mean time between failures (MTBF) and the added expense of repair and maintenance.

The second approach used to retrofit Gen III image intensifier tubes into a specific Gen II tube application is set forth in U.S. Pat. No. 5,029,963 entitled "REPLACEMENT DEVICE FOR A DRIVER'S VIEWER" to Naselli et al and assigned to ITT Corporation, the assignee herein. The approach of the Naselli patent is illustrated in FIG. 3. Referring to FIG. 3 it can be seen that the Naselli patent uses a Gen III image intensifier tube 16 coupled with an inverter lens assembly 20. The inverter lens assembly 20 reinverts the inverted image A2 from the objective lens passing through the Gen III tube producing the inverted image A3 needed at the pupil of the eyepiece lens assembly 14. The inverter lens assembly 20 is arranged so as to compensate for the undersized shape of the Gen III tube and to provide a properly oriented and focussed image to the eyepiece lens assembly 14. In this application, the relay lens magnifies the image format from 25 mm to 46 mm diameter and presents the image to the eyepiece.

In order to carry out the required inversion and magnification functions, the inverter lens assembly of the Naselli invention is comprised of over ten different lenses and/or similar optical components. Each of the individual optical components has a different thickness and radius of curvature. The large number of components involved makes the overall assembly both expensive and complicated to manufacture.

Additionally, U.S. Pat. No. 5,305,142 to Phillips, having a filing date of Mar. 6, 1992, entitled "REPLACEMENT ASSEMBLY FOR AN IMAGE INTENSIFIER TUBE", and assigned to ITT Corporation the assignee herein, discloses a replacement assembly for a night vision device, wherein the inverter lens assembly is adjustably positionable within the housing of the housing of the assembly. In a similar fashion to the Naselli invention described above, the inverter assembly described in the Phillips patent application includes over ten different lenses of various sizes and shapes, and having different thicknesses and radii of curvatures. Accordingly, the great number of individual components which are required make the lens assembly of Phillips both costly and complex to manufacture.

As has been previously mentioned, the MX-9644 Gen II image intensifier tube has been the tube of choice in many night vision applications. Those applications include, but are not limited to, Model AN/PVS-4 Individual Served Weapon Sight, the Model AN/TVS-5 Crew Served Weapon Sight, the Model M-36 Night Vision Elbow for tanks, the Model AN/VVS-2 Drivers Viewer and various commercial night vision systems. Some of the above applications, including the AN/VVS-2 Driver's Night Vision Viewer, currently utilize a U.S. military part number MX-9610 GEN II Tube Magnifier Assembly. Thus, design of an assembly which incorporates the Gen III image intensifier tube and which is directly compatible in form, fit and function with the MX-9610 assembly would be highly desirable for upgrade purposes.

It is therefore an objective of this invention to provide an image intensifier system that includes a Gen III image intensifier tube that can be retrofitted into an MX-9610 Gen II image intensifier tube application.

It is further an object of the present invention to provide an image intensifier system which is less costly and less complicated to produce than other prior art Gen III retrofit assemblies.

SUMMARY OF THE INVENTION

The present invention is an image intensifier assembly that includes a 25 mm format Generation III image intensifier tube. The Gen III tube is optically coupled to a high efficiency single piece fiber optic inverter expander element. The assembly allows the Gen III image tube parameters to be optimally transferred through the fiber optic element while being inverted 180 degrees and being expanded to 46 mm so as to fit existing system applications. The optical length of the of the tube module and inverter expander is controlled so as to meet focal planes within existing systems. A Gen III power supply is coupled to the Gen III tube module. The assembly is covered by a hard coat Noryl housing which meets all physical electrical optical requirements of existing systems. The tube module is potted in RTV compound for environmental protection.

The present invention assembly allows the improved performance characteristics of the Gen III image intensifier tube to be used in those previously developed system slots requiring a Gen II electro static image intensifier. The overall tube reliability is increased by a factor of four. The reduction of components, including relay lens assembly and both the Gen I module and power supply reduces the overall cost by 30 to 35%. The single optical couple to the single piece fiber optic inverter expander greatly enhances the overall tube performance parameters.

The present invention image intensifier assembly can be retrofitted into existing type MX-9610 Generation II image intensifier tube assembly applications in order to upgrade present systems.

BRIEF DESCRIPTION OF THE FIGURES

For a better understanding of the present invention, reference may be had to the following description of an exemplary embodiment thereof, considered in conjunction with the accompanying drawings, in which:

FIG. 1 shows a prior art schematic of the optical components of a night vision device utilizing a Generation II image intensifier tube;

FIG. 2 shows a prior an schematic of the night vision device of FIG. 1 wherein the Generation II image intensifier tube is replaced with a combination Generation III/Generation I image intensifier tubes;

FIG. 3 shows a prior art schematic of the night vision device of FIG. 1 wherein the Generation II image intensifier tube is replaced with an inverter lens assembly that includes a Generation Ill image intensifier tube;

DETAILED DESCRIPTION OF THE DRAWINGS

Figure 4:
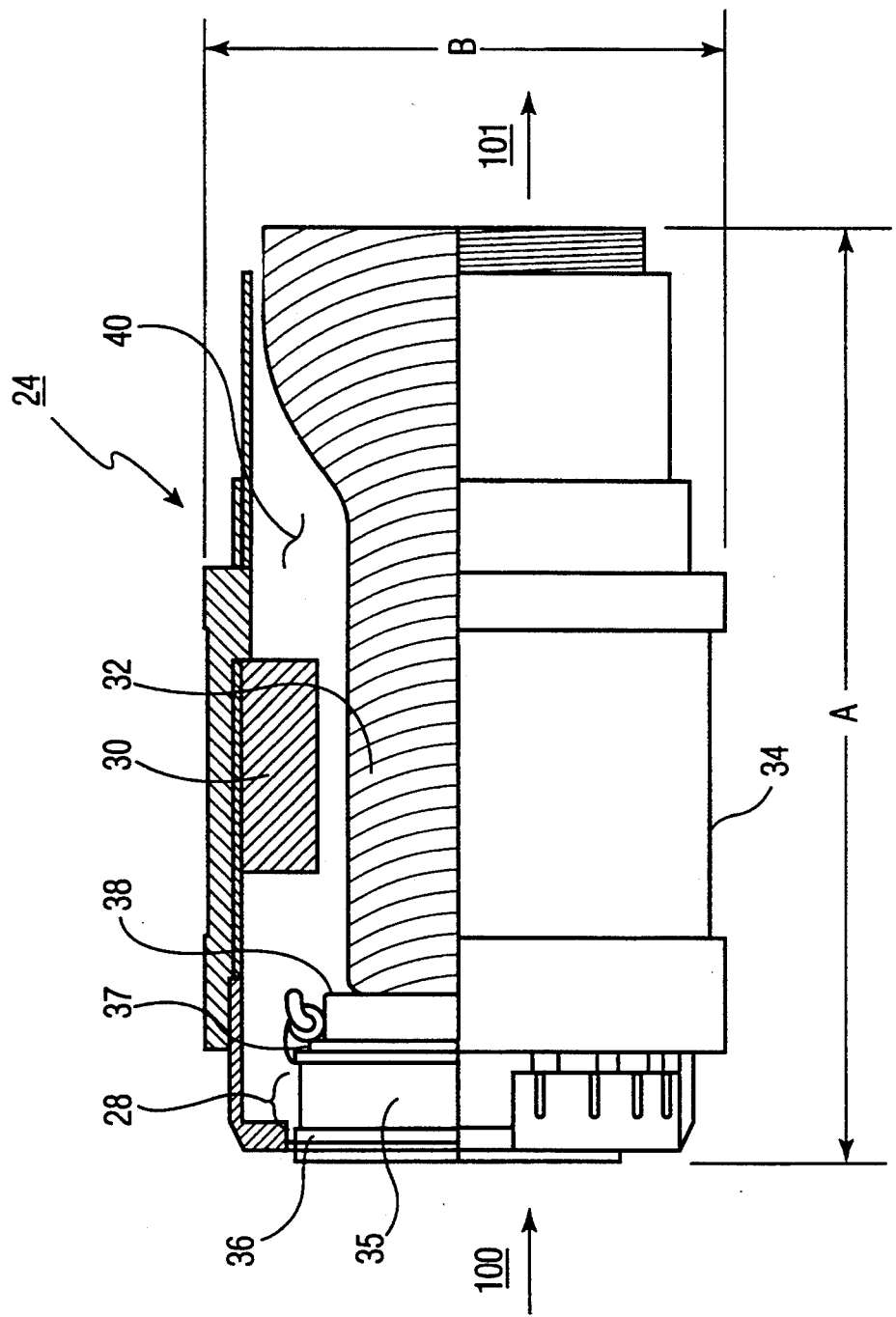
FIG. 4 is a selectively sectioned side view of one embodiment of the present invention image intensifier assembly.

Referring to FIG. 4 the present invention image intensifier assembly 24 is shown. The image intensifier assembly 24 is comprised of a Generation III image intensifier tube 28, an integral power supply unit 30 and a fiber optic inverter expander element 32, all held within a main housing 34. The main housing 34 has two opposed open ends, a light input end 100 and light output end 101.

The Gen III image intensifier tube 28 is positioned adjacent the fiber optic inverter expander element 32. The form and function of the Gen III image intensifier tube 28 are well known in the art and include a gallium arsenide photocathode 35 bonded to a specially designed fiber optic faceplate 36, a microchannel current amplifier plate 37 and an output plate or window 38. In the shown embodiment, the output window 38 is formed of a fiber optic phosphor screen. The Gen III image intensifier tube 28 is powered by the power supply 30. The Gen III image intensifier tube 28 is optically coupled to the fiber optic invention expander by standard coupling media. The Gen III image intensifier tube 28, the power supply 30 along with the fiber optic inverter expander is secured in place with potting compound 40, such as an RTV compound. Standard processes are used for sealing and aligning these components within the housing 34. Power for the assembly is provided from the night vision system housing through external pins on the housing 34. Input voltage is 2.0 to 3.0 Vdc. The housing has a nominal length A and a nominal width B. The housing may be made of any suitable hard coat material to withstand shock, for example, a hard coat Noryl housing which meets all physical electrical optical requirements of existing systems.

The Gen III image intensifier tube 28 is positioned such that the optical axis of the Gen III tube 28 is directly aligned with the optical axis of the inverter expander element 32. The inverter expander 32 is a fused fiber optic assembly. Glass fibers are optically clad, precisely aligned and fused together to efficiently transfer a high resolution image from one surface to another in the desired electro-optical system. Cladding acts as optical insulation and insures that light travels through the fiber by total internal reflection. The fibers are stacked and fused at exactly defined temperatures and high pressure to form a solid fiber glass boule from which components are made. The finished product contains millions of individual fibers precisely aligned to provide high resolution imagery. Each of the millions of fibers in a fused fiber optic assembly carries a portion of the image or "pixel." Since the image is on the surface of a fused fiber optic, these components can be directly coupled for very high efficiency transfer of images between electro-optical image tubes.

Figure 5:
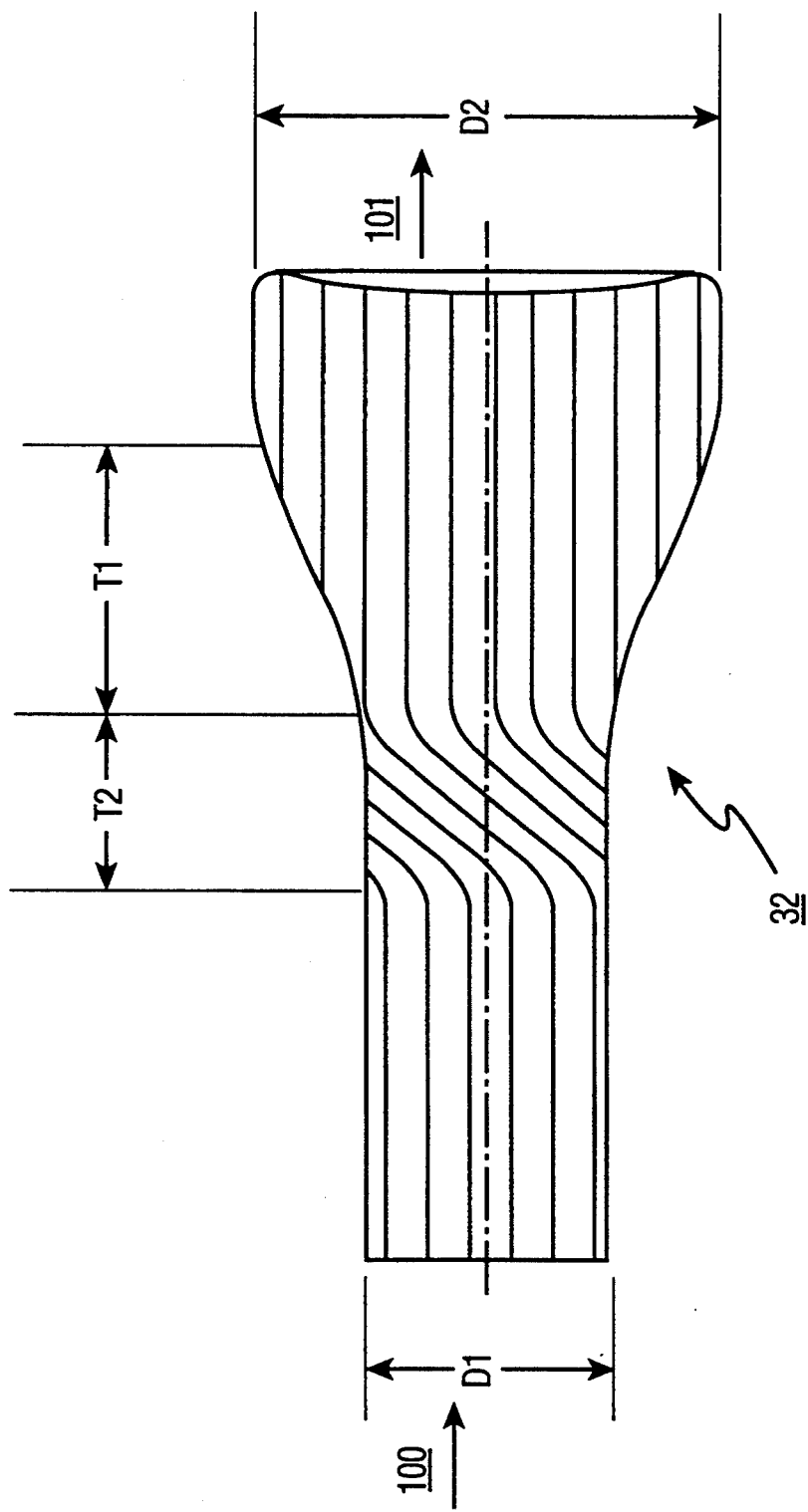
FIG. 5 is a selectively sectioned side view of one preferred embodiment of the single piece fiber optic inverter expander element of the present invention; and FIGS. are 6a and 6b are illustrations of a driver's viewing assembly for a vehicle.

Referring to FIG. 5, there is shown one preferred embodiment of the fiber optic inverter expander element 32 as used in the image intensifier assembly 24 of the present invention. As can be seen the inverter expander 32 is a single piece fiber optic component generally having a half hourglass shape. The inverter expander 32 has a first diameter D1 at the light input end 100 and a second diameter D2 at the light output end 101. A first region T1 is gradually tapered in between the first diameter D1 and the second diameter D2, causing such fiber optic components to sometimes be referred to as "tapers". Fiber optic tapers, such as that shown in FIG. 5, have the optical properties of magnifying or reducing the size of an object they transmit in a very compact and efficient manner. Tapers have significant advantages over traditional lens assemblies because they are rigid and cannot go out of adjustment, as well as being virtually free from distortion.

A second region T2, located before the tapered region T1 of the inverter expander 32, contains a twist in the fiber optic element. The twisted region T2 causes an image to be inverted by 180 degrees or some other multiple thereof. For this reason, image inverters having a twisted fiber optic region are some times referred to as "twisters." Thus, the fiber optic element 32 of the present invention assembly is both an inverter and expander. The specific inverter expander 32 shown in FIG. 5 inverts by 180 degrees a 25 mm image at the light input end 100 and expands that same image to 46 mm. The inverter expander 32 is much more efficient, compact and reliable than the tube lens assembly which it replaces. It will be understood, however, that other applications of the present invention assembly may require different variations of magnification and that some applications may require a fiber optic inverter with substantially no optical expansion.

The inverter expander 32 is formed from a fused cylindrical boule. The boule is heated through its middle until soft enough to be stretched into an hourglass shape without distortion. The inverter is made by reshaping the boule with critically controlled heating and torquing. The symmetrical hourglass is then cut and machined into two identical fiber optic components.

Figure 6B:
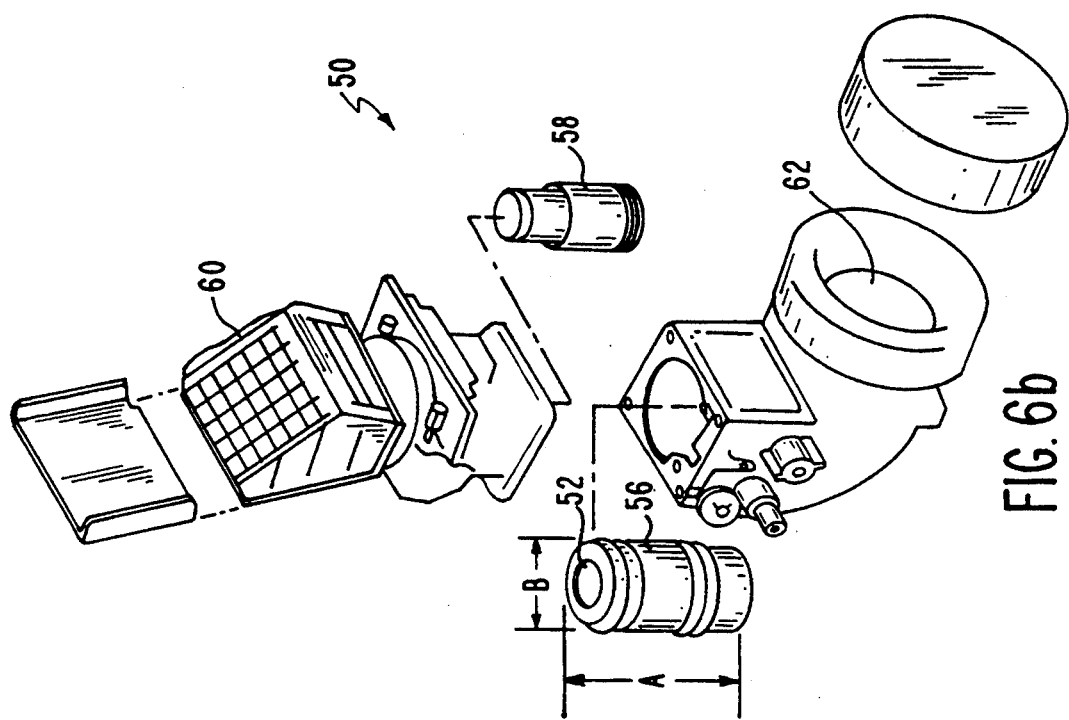
Figure 6A:
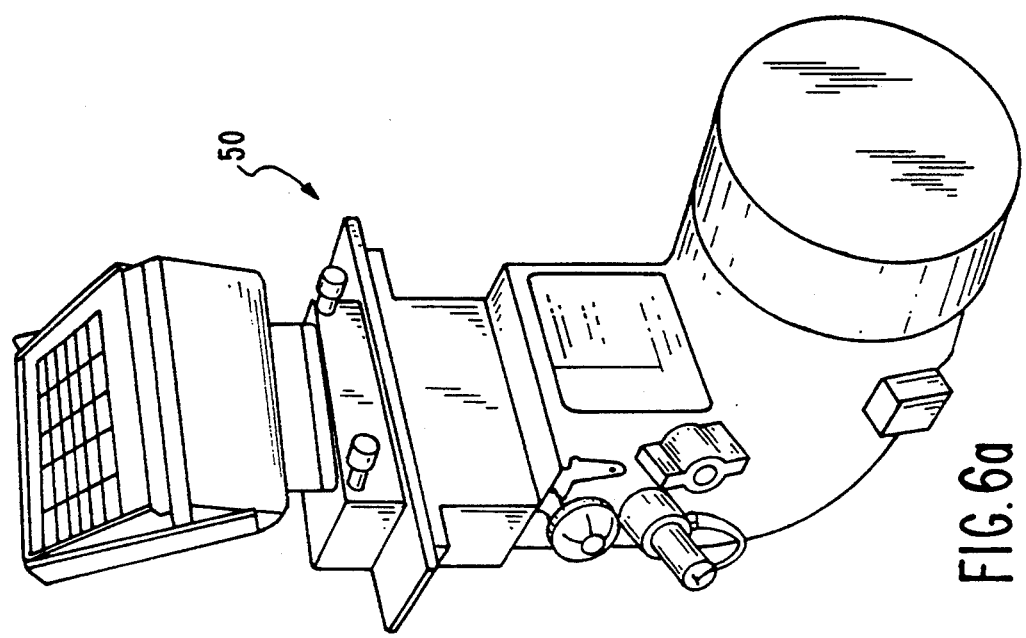

Although the present invention image intensifier tube assembly can be used to replace any type MX-9610 Generation II image intensifier tube assembly, the function of the present invention will be detailed in relation to a Model AN/VVS-2 Driver's Night vision Viewer. As was mentioned, a significant portion of the military and commercial night vision equipment currently in use was designed to physically accommodate a Gen II image intensifier tube. One particular piece of equipment which is in widespread use is an AN/VVS-2 Driver's Night Vision Viewer as shown in FIG. 6a. An exploded view of the Driver's Night Viewer is shown in FIG. 6b. A Driver's Viewer 50 is a periscope type of arrangement used on military vehicles, such as tanks. It incorporates a Gen II electro static image intensifier tube 52 enclosed in a housing 56. The housing 56 has a nominal length A of 130 mm and a nominal width B of 72 mm. An objective lens assembly 58 is positioned in front of the tube 52. The housing 56 containing the Gen II tube, and known as U.S. military part number MX-9610, is positioned in the viewer between a window/mirror assembly 60 and a biocular eyepiece 62 through which the driver of the vehicle views the scene ahead.

Referring back to FIG. 4, it can be seen that the overall length A of the housing 34 is nominally 130 mm (or 5.130 inches) which corresponds to the length A of FIG. 6a and the overall width B of the housing 34 is nominally 72 mm (or 2.813 inches) which corresponds to the width B of the housing 56 shown in FIG. 6a. Thus, the assembly 24 of the present invention is a direct form and function replacement for the housing 56 of the MX-9610 assembly which incorporates the Gen II tube as shown in FIG. 6b.

Referring to FIG. 4, it can be seen that an image present at the light input end 100 of the image intensifier assembly will be processed by means of the Gen III image intensifier tube 28. As the image travels from the output plate 38 of the Gen III tube 28, it will enter the inverter expander element 32. The image will be inverted 180 degrees by means of the twisted fiber optic region. The image will then be expanded from 25 mm to 46 mm by means of the tapered region within the inverter expander element 32, in order to meet the existing requirements of systems utilizing the prior art Gen II MX-9610 assembly. The optical length of the Gert III image intensifier tube module 28 and the inverter expander element 32 is controlled so as to meet focal planes within existing systems. The single optical couple to the single piece fiber optic inverter expander 32 greatly enhances the overall tube performance.

The assembly 24 of the present invention provides many advantages over the prior art. The modulation transfer function of the inverter expander 32 is greater than that of the Gen I tube or a traditional relay lens arrangement. In addition, the cost of using the single piece fiber optic inverter expander 32 instead of a relay lens assembly or a Gen I tube is greatly reduced, as is the cost of the power supply for the Gen III tube. Because there is only one image intensifier tube, and the power supply is greatly simplified, and the mean time between failure is increased. Additionally, since far fewer overall components are used, the manufacturing costs are reduced while the reliability is increased. The single optical couple to the single piece fiber optic inverter expander greatly enhances the overall tube performance parameters.

From the above, it should be understood that the embodiment described, in regard to the drawings, is merely exemplary and that a person skilled in the art may make variations and modifications to the shown embodiment without departing from the spirit and scope of the invention. All such variations and modifications are intended to be included within the scope of the invention as defined in the appended claims.

What is claimed is:

1. An image intensifier assembly comprising:
   a Generation III image intensifier tube located at one end of said assembly; and
   a fiber optic inverter element optically coupled to said Generation III image intensifier tube for inverting an image produced by said Generation III image intensifier tube, wherein said fiber optic inverter element expands said image produced by said Generation III tube by a predetermined ratio.

2. The assembly of claim 1, wherein said Generation III image intensifier tube and said fiber optic inverter element are held within a housing means such that the optical axis of said image intensifier tube is substantially aligned with the optical axis of said inverter element.

3. The assembly of claim 2, wherein said housing means has a nominal length of 130 mm and a nominal width of 72 mm, thereby having essentially the same dimensions as a Generation II image intensifier tube.

4. The assembly of claim 1, wherein said fiber optic inverter element includes a twisted region in between a first end and a second end of said element for inverting said image by 180 degrees.

5. The assembly of claim 1, wherein said fiber optic element is tapered in a single taper from a first diameter at said one end of said assembly to a second larger diameter at an output end of said assembly, thereby expanding said image.

6. The assembly of claim 1, wherein said fiber optic inverter expands a 25 mm image to a 46 mm image.

7. The assembly of claim 1, wherein said assembly is a direct retrofit for Specific Generation II image intensifier applications.

8. In a night viewing device having an image intensifier assembly positioned between an objective lens assembly and an eyepiece assembly, an improved image intensifier assembly comprising:
   a Generation III image intensifier tube for creating an image from light received through said objective lens assembly; and
   a fiber optic inverter-expander element optically coupled to said Generation III image intensifier tube for inverting and expanding an image produced by said Generation III image intensifier tube.

9. The assembly of claim 8, wherein said fiber optic element is tapered in a single taper from a first diameter at a first end of said element to a second larger diameter at a second end of said element, said element also including a twisted fiber optic region between said first and second end, whereby an image present at said first end is inverted by 180 degrees and expanded to a predetermined size at an output of said assembly.

10. The assembly of claim 8, wherein said Generation III image intensifier tube and said fiber optic inverter-expander element are held within a housing means such that the optical axis of said image intensifier tube is substantially aligned with the optical axis of said inverter-expander element.

11. The assembly of claim 10, wherein said housing means has a nominal length of 130 mm and a nominal width of 72 mm, thereby having essentially the same dimensions as a Generation II image intensifier tube.

12. The assembly of claim 8, wherein said fiber optic element expands a 25 mm image to a 46 mm image.

13. The assembly of claim 8, wherein said assembly is a direct retrofit for specific Generation II image intensifier applications.

14. The assembly of claim 13, wherein the optical length of the Generation III tube and the inverter-expander element is controlled to meet focal planes associated with said night viewing device.

15. A combination inverter and enlargement apparatus for use with a Generation III image intensifier tube, said apparatus comprising:
   a fiber optic element having a first cross-sectional diameter at a first end of said apparatus proximate said Generation III intensifier tube and a larger transverse cross-sectional diameter at a second end of said apparatus, said element being tapered and twisted in a region in between said first and second ends, whereby an image present at said first end of said apparatus is expanded and inverted at said second end of said apparatus, and
   an image intensifier tube coupled to said fiber optic element.

16. The apparatus of claim 15, wherein said Generation III image intensifier tube and said fiber optic element are held within a housing means such that the optical axis of said image intensifier tube is substantially aligned with the optical axis of said fiber optic element.

17. The apparatus of claim 15, wherein said fiber optic element inverts and expands a 25 mm image to a 46 mm image.

18. A method of replacing a Generation II with a Generation III image intensifier tube, said method comprising the steps of:
   providing a housing having substantially the same dimensions as a Generation II image intensifier tube, wherein said housing has an input end and an output end;
   positioning a Generation III image intensifier tube at said input end of said housing; and
   inserting a fiber optic inverter-expander element into said housing in between said Generation III image intensifier tube and said output end, whereby an image produced by said Generation III image intensifier tube is inverted and expanded at said output end of said housing.

19. The method of claim 18, wherein said housing is a direct replacement for specific Generation II image intensifier applications.

20. The method of claim 18, wherein said image is expanded from 25 mm to a 46 mm image.

21. An image intensifier assembly comprising:
a Generation III image intensifier tube located at one end of said assembly; and
a fiber optic inverter element optically coupled to said Generation III image intensifier tube for inverting an image produced by said Generation III image intensifier tube, wherein a first end of said fiber optic inverter element substantially overlies the entire viewable surface of said Generation III image intensifier tube, said inverter element being adapted to receive an image to be viewed through said image intensifier tube.

22. The assembly of claim 21, wherein said fiber optic element is adapted to receive a 25 mm image.

23. The assembly of claim 21, wherein said Generation III image intensifier tube includes a fiber optic phosphor screen, said first end of said fiber optic inverter element being coupled to said fiber optic screen.

24. The assembly of claim 21, wherein said fiber optic inverter element is formed from a solid glass boule of fused fibers.

25. The assembly of claim 24, wherein said fiber optic inverter element includes a twisted region therein, whereby an image received at said first end of said element is inverted by 180° at an output thereof.

* * * * *